(12) United States Patent
Yang et al.

(10) Patent No.: US 10,743,696 B2
(45) Date of Patent: Aug. 18, 2020

(54) PARCEL BOX

(71) Applicant: Micro World Corp., Arcadia, CA (US)

(72) Inventors: Johnson Yang, Arcadia, CA (US); H. G. Robert Fong, Arcadia, CA (US)

(73) Assignee: Micro World Corp., Arcadia, CA (US)

( * ) Notice: Subject to any disclaimer, the term of this patent is extended or adjusted under 35 U.S.C. 154(b) by 13 days.

(21) Appl. No.: 16/216,188

(22) Filed: Dec. 11, 2018

(65) Prior Publication Data

US 2020/0107664 A1 Apr. 9, 2020

Related U.S. Application Data

(60) Provisional application No. 62/742,831, filed on Oct. 8, 2018.

(51) Int. Cl.
*A47G 29/22* (2006.01)
*G06Q 10/08* (2012.01)
*A47G 29/124* (2006.01)

(52) U.S. Cl.
CPC .......... *A47G 29/22* (2013.01); *A47G 29/124* (2013.01); *A47G 29/1248* (2017.08); *G06Q 10/0836* (2013.01); *G06Q 10/0832* (2013.01)

(58) Field of Classification Search
CPC .... A47G 29/22; A47G 29/122; A47G 29/124; A47G 29/126; A47G 29/30; A47G 29/1248; A47G 29/1251; A47G 29/1254; A47G 29/12095; G06Q 10/0836; G06Q 10/0832
USPC ...................... 232/47–52, 24, 25, 45, 19, 38; 340/568.1, 569
See application file for complete search history.

(56) References Cited

U.S. PATENT DOCUMENTS

| | | | |
|---|---|---|---|
| 7,252,220 B1 * | 8/2007 | Shreve | A47G 29/1216 232/29 |
| 7,854,374 B2 * | 12/2010 | Dudley | A47G 29/12095 232/45 |
| 10,368,676 B1 * | 8/2019 | Ansari | A47G 29/1248 |
| 2002/0063148 A1 * | 5/2002 | Cox | A47G 29/16 232/47 |
| 2002/0162883 A1 * | 11/2002 | Arvonio | G07B 17/00193 232/45 |
| 2004/0074957 A1 * | 4/2004 | Devar | A47G 29/141 232/17 |
| 2007/0262130 A1 * | 11/2007 | Cedermarker | A47G 29/1209 232/35 |
| 2011/0084123 A1 * | 4/2011 | Cox | A47G 29/1209 232/28 |

(Continued)

*Primary Examiner* — William L Miller
(74) *Attorney, Agent, or Firm* — Martin & Ferraro, LLP

(57) ABSTRACT

A parcel box includes at least one sidewall having a first compartment and a second compartment that together form a room; a separator moveably attached to the at least one sidewall between the first compartment and the second compartment for separating the room into a first chamber and a second chamber; and a first door and a second door pivotally attached to the at least one sidewall and corresponding to the first chamber and the second chamber, respectively, wherein the first chamber and the second chamber are configured to receive two articles through the first door and the second door, respectively, and the separator is configured to moveably adjust the volume of the first chamber and the volume of the second chamber based on the weights and/or the sizes of the two articles.

14 Claims, 9 Drawing Sheets

(56) References Cited

U.S. PATENT DOCUMENTS

2016/0235236 A1* 8/2016 Byers .................... A47G 29/14
2018/0352987 A1* 12/2018 Kutas ............... A47G 29/12095

* cited by examiner

PARCEL BOX

The present application claims the benefit of Provisional Application No. 62/742,831 filed Oct. 8, 2018 all of which is incorporated by reference herein.

TECHNICAL FIELD

The present application is related to a box, and more particularly, to a parcel box.

BACKGROUND

Over the last decade, the Internet has led to the evolution of the sale and delivery of packaged goods through multiple delivery services. Specifically, people can purchase multiple pieces of merchandise from different websites before several delivery persons drop parcels or packages into a recipient's container or parcel box. Current secure containers that accept the delivery of such goods include, but are not limited to, top loading mail deposit boxes, book return containers, and one-way videotape/DVD return devices where packages are dropped into a single container area. In a conventional container, a flapper or similar mechanism located on sidewalls thereof is used to gain entry and/or restrict entry to the container in order to prevent an unintended recipient (e.g., a thief or another delivery person) from reaching a delivered good in the container. While those mechanisms provide some level of security, such schemes limit the size of the packages to/through the entry door. On the other hand, when there are several packages of different sizes or shapes to be delivered into the container, it may be difficult to deposit all of the packages of different sizes or shapes into the single container even though there is enough space inside.

Accordingly, there is a need for maximizing the useful space in the delivery boxes where multiple delivery services deliver packages at different times and of different sizes or shapes.

There is also a need for having a parcel box in which different packages are deposited into different chambers and separated from each other.

SUMMARY OF INVENTION

To this end, an objective of the present invention is to provide a parcel box for receiving multiple articles into multiple chambers.

A further objective of the present invention is to provide a parcel box, in which volumes of the chambers can be adjusted as needed.

Another objective of the present invention is to provide a parcel box, in which different chambers can be accessed from different doors at different times.

Yet another objective of the present invention is to provide a parcel box, in which articles received in different chambers are separate from each other.

To achieve the above objectives, in accordance with a first aspect of the present disclosure, a parcel box is provided and comprises at least one sidewall having a first compartment and a second compartment that together form a room; a separator moveably attached to the at least one sidewall between the first compartment and the second compartment for separating the room into a first chamber and a second chamber; and a first door and a second door pivotally attached to the at least one sidewall and corresponding to the first chamber and the second chamber, respectively. The first chamber and the second chamber are configured to receive two articles through the first door and the second door, respectively, and the separator is configured to moveably adjust the volume of the first chamber and the volume of the second chamber based on the weights and/or the sizes of the two articles.

In accordance with a second aspect of the present disclosure, the parcel box according to the first aspect is configured so that the separator includes a first hinge attached to the at least one sidewall; and a first plate hinged on the at least one sidewall via the first hinge.

In accordance with a third aspect of the present disclosure, the parcel box according to the second aspect is configured so that the separator further includes a second hinge attached to an edge of the first plate; and a second plate hinged on the first plate via the second hinge.

In accordance with a fourth aspect of the present disclosure, the parcel box according to the first aspect further includes at least one bracket positioned on the at least one sidewall for supporting an edge of the separator.

In accordance with a fifth aspect of the present disclosure, the parcel box according to the first aspect is configured so that the first compartment is above the second compartment, and when one of the articles is disposed in the second chamber and the length of the one of the articles is greater than the length of the second chamber, the separator is moved towards the first chamber.

In accordance with a sixth aspect of the present disclosure, the parcel box according to the first aspect further includes at least one resilient member, one end of which is affixed to the at least one sidewall, and the other end of which is affixed to the separator.

In accordance with a seventh aspect of the present disclosure, the parcel box according to the sixth aspect is configured so that the first chamber is above the second chamber, and when one of the articles is positioned on the separator, the separator is moved towards the second chamber.

In accordance with an eighth aspect of the present disclosure, the parcel box according to the first aspect further includes a plurality of resilient members disposed under the separator for supporting the separator; and a plurality of guiding members penetrating through the separator and the plurality of resilient members, respectively.

In accordance with a ninth aspect of the present disclosure, the parcel box according to the eighth aspect is configured so that the separator further includes a base plate; and a front plate disposed on an edge of the base plate.

In accordance with a tenth aspect of the present disclosure, the parcel box according to the ninth aspect is configured so that the separator further includes a plurality of side plates disposed on other edges of the base plate, respectively.

In accordance with an eleventh aspect of the present disclosure, the parcel box according to the first aspect further includes two locks disposed on the first door and the second door, respectively.

In accordance with a twelfth aspect of the present disclosure, the parcel box according to the first aspect is configured so that the parcel box further includes a bottom plate on which the at least one sidewall is disposed; and a top plate disposed on the at least one sidewall.

In accordance with a thirteenth aspect of the present disclosure, the parcel box according to the twelfth aspect is configured so that the at least one sidewall includes four sidewalls standing on the bottom plate to form a parallelepiped shape with the top plate.

In accordance with a fourteenth aspect of the present disclosure, the parcel box according to the first aspect further includes a guard mechanism attached to the separator for separating the first chamber from the second chamber.

In accordance with a fifteenth aspect of the present disclosure, the parcel box according to the first aspect further includes a third door located between the first door and the second door, and the first chamber is accessible through the third door.

In accordance with a sixteenth aspect of the present disclosure, a parcel box includes four sidewalls codefining a first compartment and a second compartment that together form a room, the first compartment having a first opening, and the second compartment having a second opening; a separator moveably attached to one of the four sidewalls between the first compartment and the second compartment for separating the room into a first chamber and a second chamber; wherein the first chamber and the second chamber are configured to receive at least one article through the first opening and the second opening, respectively, and the separator is configured to moveably adjust the volume of the first chamber and the volume of the second chamber based on the weight and/or the size of the at least one article.

BRIEF DESCRIPTION OF THE DRAWINGS

The invention, as well as a preferred mode of use, further objectives, and advantages thereof, will be best understood by referring to the following detailed description of illustrative embodiments in conjunction with the accompanying drawings, wherein.

DETAILED DESCRIPTION

Figure 1:
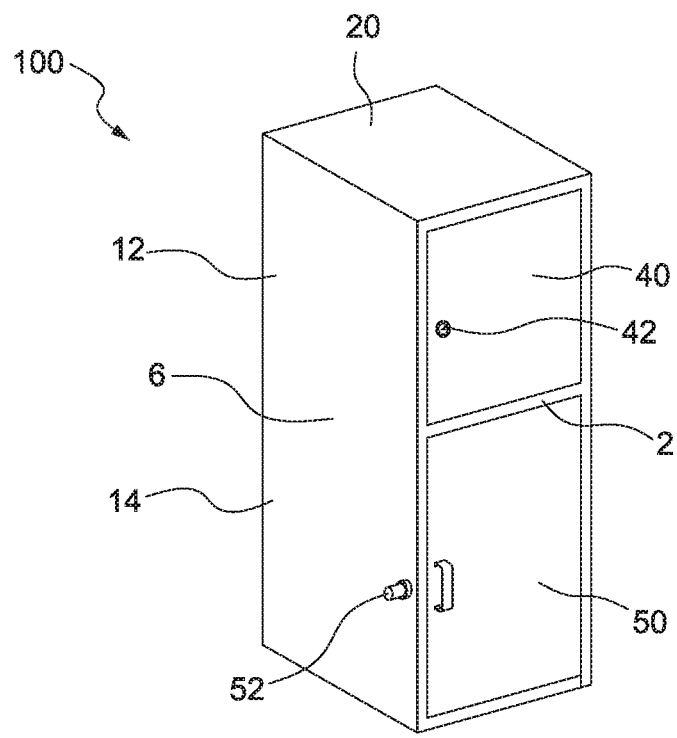
FIG. 1 is a perspective view of a parcel box in accordance with a first embodiment of the disclosure.

The characteristics, subject matter, advantages, and effects of the present disclosure are detailed hereinafter by reference to embodiments of the present disclosure and the accompanying drawings. It is understood that the drawings referred to in the following description are intended only for purposes of illustration, and do not necessarily show the actual proportion or precise arrangement of the embodiments. Therefore, the proportion and arrangement shown in the drawings should not be construed as limiting or restricting the scope of the present invention. The invention is capable of having other embodiments and of being practiced or of being carried out in various ways.

The terminology used in the description of the present disclosure herein is for the purpose of describing particular embodiments only, and is not intended to be construed as a limitation of the invention. As used in the description of the invention and the appended claims, the singular articles of "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes." "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The use of directional adjectives "inner, "outer," "upper," "lower," and like terms, are meant to assist with understanding relative relationships among design elements and should not be construed as meaning an absolute direction in space nor regarded as limiting.

Figure 2:
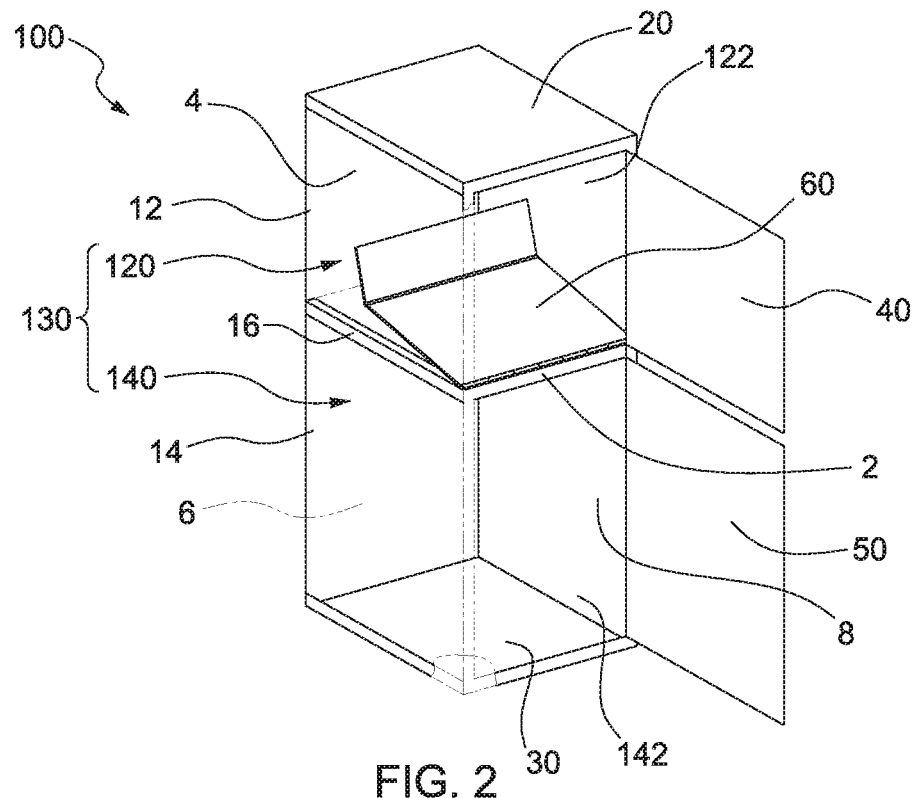
FIG. 2 is a perspective view of the parcel box in FIG. 1, where two doors are open, a sidewall is omitted, and the inside of the box is shown.

Referring to FIGS. 1-2, wherein FIG. 1 is a perspective view of a parcel box 100 in accordance with a first embodiment of the disclosure and FIG. 2 is a perspective view of the parcel box 100 in FIG. 1 in which a first door and second door are open, a parcel box 100 is provided for delivery and pickup of multiple parcels, mail and/or packages. The parcel box 100 of the present disclosure may be mounted on along a roadway, beside a driveway, on the wall of a house, or within an office. The parcel box 100 includes at least one sidewall, a top plate 20, a bottom plate 30, a first door 40, a second door 50 and a separator 60. The at least one sidewall connects the top plate 20 and the bottom plate 30 for forming a room 130 together. In this embodiment, the parcel box 100 has a substantially parallelepiped shape and the at least one sidewall includes four sidewalls, i.e., a first (or front from an observer's view) sidewall 2, a second (or rear from an observer's view) sidewall 4 opposite to the first sidewall 2, a third (or left from an observer's view) sidewall 6 and a fourth (or right from an observer's view) sidewall 8 opposite to the third sidewall 6, standing on four corresponding edges of the bottom plate 30, respectively, such that the room 130 is encompassed by the four sidewalls 2, 4, 6, 8. The shapes of the top plate 20 and the bottom plate 30 are, but not limited to be, substantially rectangular. In addition, the materials of the sidewalls 2, 4, 6, 8, the top plate 20 and the bottom plate 30 are steel. In other embodiments, the materials are stainless steel for corrosion resistance.

The room 130 is divided into a first compartment 12 and a second compartment 14. The first compartment 12 has a first chamber 120 and a first opening 122 open to the front of the box 100, and the second compartment 14 has a second chamber 140 and a second opening 142 open to the front of the box 100. In this embodiment, the first chamber 120 is above the second chamber 140. The volume of the room 130 is fixed and is equal to the sum of the volume of the first chamber 120 and the volume of the second chamber 140. In this embodiment, the first chamber 120 is smaller than the second chamber 140 so that the first chamber 120 is preferably suitable for storing a smaller parcel, and vice versa.

The first door 40 and the second door 50 are pivotally attached to a front edge of either one of the third sidewall 6 and the fourth sidewall 8 and correspond to the first chamber 120 and the second chamber 140, respectively for selectively opening or closing the first opening 122 of the first compartment 12 and/or the second opening 142 of the second compartment 14, respectively. As shown in FIG. 1, in this embodiment, the parcel box 100 further includes a first lock 42 and a second lock 52 attached to the first door 40 and the second door 50, respectively, for preventing an unintended recipient from opening the first door 40 and/or the second door 50. The first lock 42 and the second lock 52, for example, are conventional key locks, push-locks or biometric locks for recognizing stored physiological characteristics of users, e.g., fingerprint. As each of the first chamber 120 and the second chamber 140 receives an article, the delivery person(s) can secure the first door 40 and the second door 50 through such first lock 42 and the second lock 52, respectively. The articles may be parcels, mail, packages or the like.

As shown in FIGS. 1 and 2, since most areas on the front of the box 100 are occupied by the first opening 122 and the second opening 142, the first sidewall 2 in the current embodiment is in the shape of a bar which connects the third sidewall 6 at one end thereof and the fourth sidewall 8 at the other end thereof. Further, the separator 60 is moveably attached to the inner side of the bar 2 and variably separates the first chamber 120 from the second chamber 140. Therefore, depending on the position of the separator 60, the volume of the first chamber 120 and the volume the second chamber 140 are adjustable.

Figure 3:
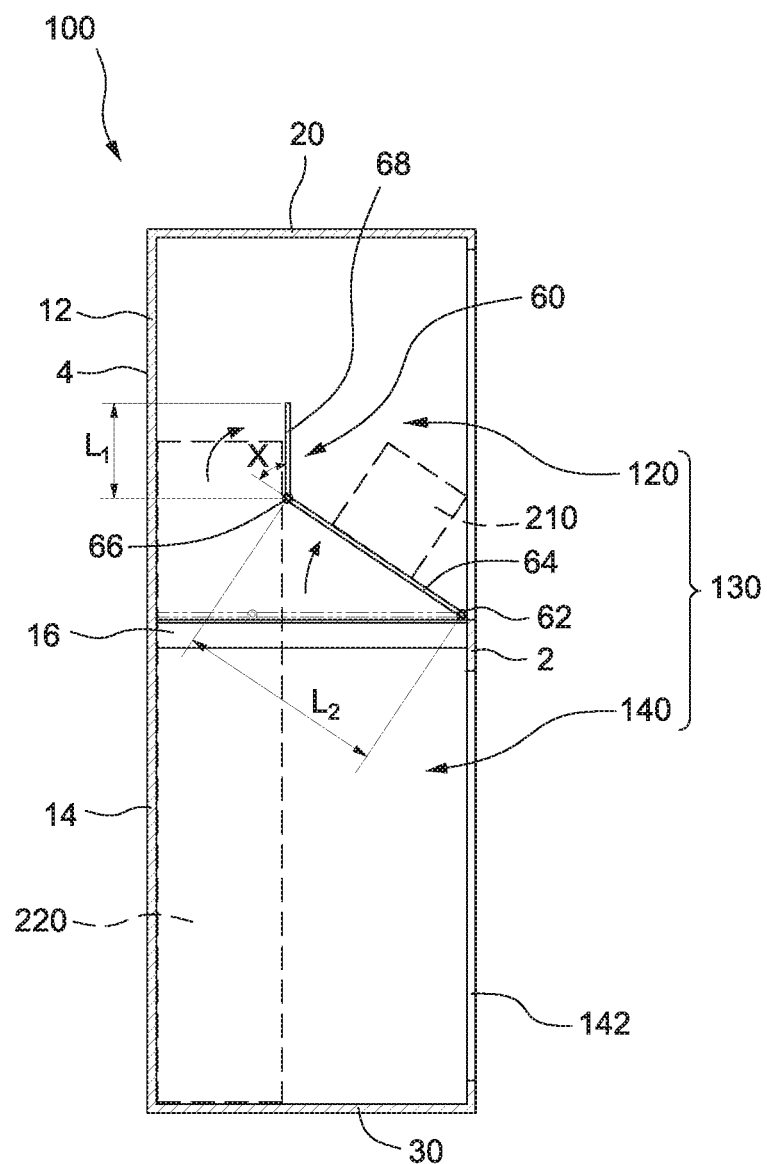
FIG. 3 is a cross sectional view of the parcel box in FIG. 1, where two articles are deposited into a first chamber and a second chamber, respectively.

Referring to FIGS. 2-3, wherein FIG. 3 is a cross sectional view of the parcel box 100 in FIG. 1 and discloses the structure of the separator 60 in details, the separator 60 includes a first hinge 62 and a first plate 64. The first hinge 62 is attached to the inner side of the bar 2. The first plate 64 is substantially rectangular and is hinged to the bar 2 via the first hinge 62. The separator 60 further includes a second hinge 66 and a second plate 68. The second hinge 66 is attached to a distal edge, opposite to the first hinge 62, of the first plate 64. The second plate 68 is also substantially rectangular and is hinged to the distal edge of the first plate 64 via the second hinge 66. Therefore, the first plate 64 is located between the first door 40 and the second plate 68. In this embodiment, the length $L_2$ of the lateral sides of the first plate 64 is greater than the length $L_1$ of the lateral sides of the second plate 68, as best shown in FIG. 3. The first plate 64 and the second plate 68 may be either rigid or flexible, in whole or in part, to accommodate parcels of different sizes and shapes in the parcel box 100.

Furthermore, in this embodiment, the parcel box 100 includes at least one bracket 16 positioned on at least sidewall 2, 4, 6, 8 and between the first chamber 120 and the second chamber 140. The at least one bracket 16 is preferably bar-shaped and is configured to support at least one edge of the separator 60. In this embodiment, there are two brackets 16 disposed on two opposing sidewalls 6 and 8 such that the separator 60 (dotted-broken lines as shown in FIG. 3) can rest on the two brackets 16.

Accordingly, as best shown in FIG. 3, due to the arrangement of the brackets 16, the separator 60 is prevented from moving towards the second compartment 14. In other words, the first plate 64 is configured to pivot about the first hinge 62 in the first compartment 12, and the second plate 68 is configured to pivot about the second hinge 66 in the first compartment 12.

In operation, when a first article 210 (e.g., a parcel) having a height less than the height of the first compartment 12 and the height of the second compartment 14 is delivered by a delivery person, the delivery person may preferably open the first door 40 and drop the first article 210 into the first chamber 120. After the first article 210 is disposed on the separator 60, the first door 40 may be locked up automatically or by the delivery person.

When an article (not shown) delivered by another delivery person has a height less than the height of the second compartment 14, the article is dropped on the bottom plate 30. Given that the height of the article is less than the height of the second compartment 14, the article is not in contact with the separator 60 so that the separator 60 still rests on the bracket 16. At this time, the volume of the first chamber 120 and the volume of the second chamber 140 remain unchanged.

When a second article 220 with a height exceeding the height of the second compartment 14 is delivered by a delivery person (i.e., the size of the second article 220 is greater than the size of the first article 210), the second article 220 is inserted into the second chamber 140. Because the height of the second article 220 is greater than the height of the second compartment 14, the top of the second article 220 pushes the separator 60 upwardly towards the first compartment 12, and the separator 60 can be accordingly pushed upwardly to increase the volume of the second chamber 140 for appropriately storing the second article 220. Further, the second article 220 is disposed on the bottom plate 30 and protrudes from the second compartment 14 towards the first compartment 12. The second plate 68 vertically leans against the second article 220 about the second hinge 66, and the first plate 64 is pivoted to incline with respect to the bar 2. The first article 210 disposed on the separator 60 is also inclined with the second plate 68 and may lean against the first door 40. After the second article 220 is stored inside the second chamber 140, the second door 50 may be locked up automatically or manually. Since the first plate 64 and the second plate 68 of the separator 60 flip upwardly, the separator 60 blocks the path between the first chamber 120 and the second article 220 so that even when the first door 40 is unlocked, an unintended recipient has no access to the second article 220 through the first chamber 120. Thus, such separator 60 facilitates the securing of parcels (e.g., the first article 210 and the second article 220) that may be delivered at different times and also permits the securing of the delivered parcels of sizes and shapes, that are substantially different than what a fixed individual chamber would accommodate alone. In addition, due to the structural design of the second hinge 66, the second plate 68 is configured to rotate no more than a certain angle (for example, a first angle X) about the second hinge 66 with respect to the first plate 64. The limited first angle X prevents the second plate 68 from flipping to an excessive degree such that the second plate 68 is also considered a block for preventing access to the second article 220 via the first chamber 120. A maximum first angle X could be, for example, around 90 degrees.

Figure 4:
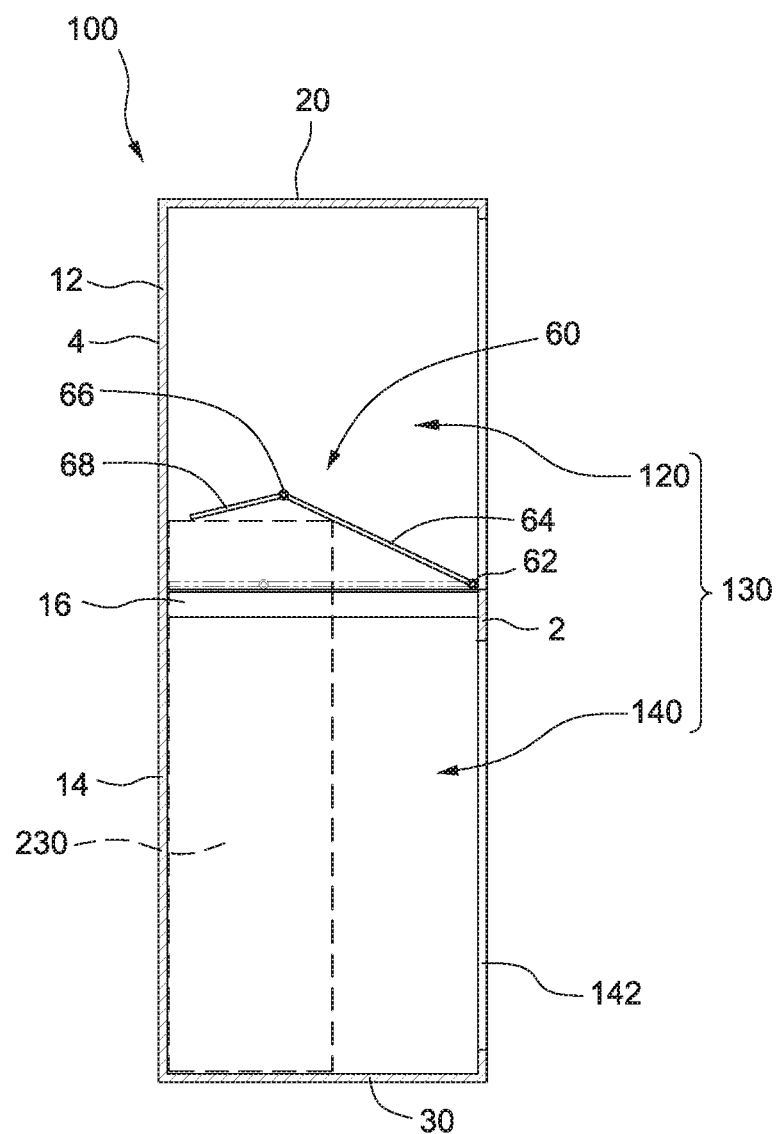
FIG. 4 is a cross sectional view of the parcel box in FIG. 1, where an article is deposited into a second chamber.

In another embodiment, as shown in FIG. 4, which is a cross sectional view of the parcel box 100 in FIG. 1 where an article is deposited into a second chamber 140, when a third article 230 having a shorter height and longer length than those of the second article 220 is delivered into the second chamber 140, the separator 60 is pushed outwardly in accordance with the size and shape of the third article to increase the volume of the second chamber 140. At the same time, both the first plate 64 and the second plate 68 are disposed on the top of the third article 230. Since the third article 230 is covered by the separator 60, another person is unable to get access to the third article 230.

Figure 5:
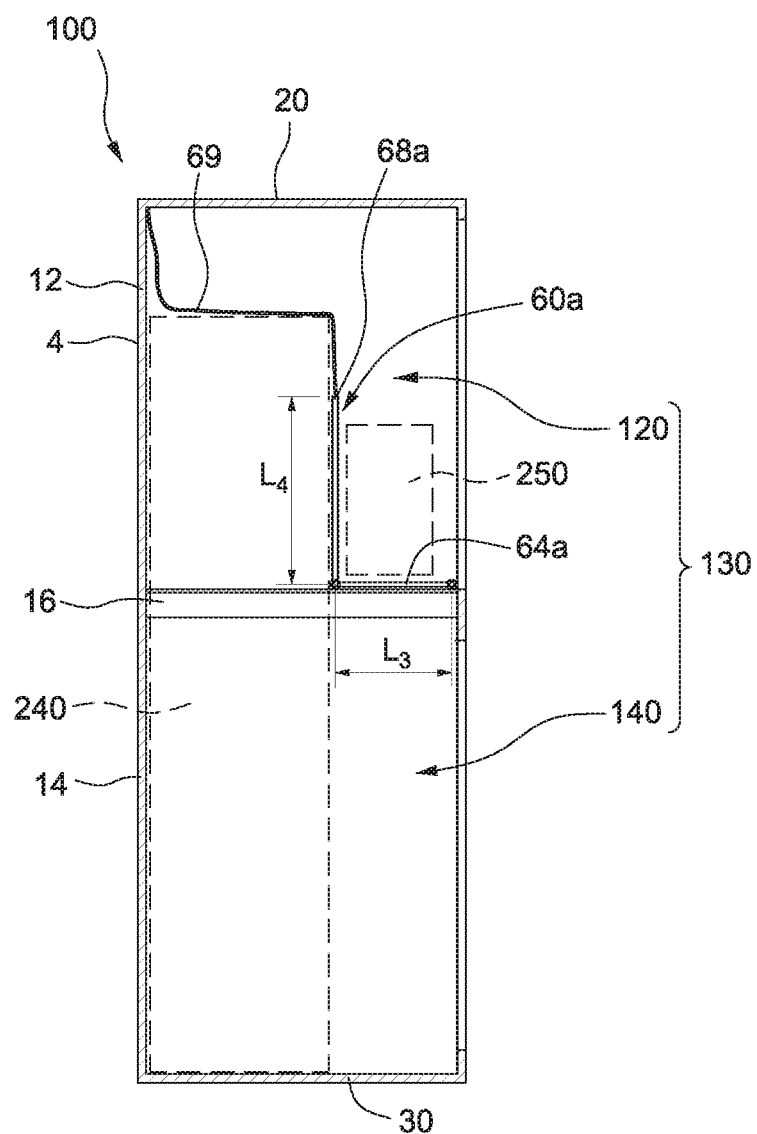
FIG. 5 is a cross sectional view of the parcel box in FIG. 1, where two articles are deposited into a first chamber and a second chamber, respectively.

Referring to FIG. 5, which is a cross sectional view of the parcel box 100 in FIG. 1 where a fourth article 240 and a fifth article 250 are deposited into a first chamber 120 and a second chamber 140, respectively, in this embodiment, the lateral length L3 of the first plate 64a is less than the lateral length L of the second plate 68a. The configuration of the separator 60a shown in FIG. 5 is beneficial for a larger fourth article 240 to be stored in the second chamber 140, and a smaller fifth article 210 is horizontally disposed on the first plate 64a in the first chamber 120. Even though an unintended recipient may be in contact with the fourth article 240 through the top of the first chamber 120, there is not enough space for the unintended recipient to pull the fourth article 240 out in that the second plate 68a is high enough to become a block between the first chamber 120 and the fourth article 240.

Accordingly, given that the separator 60 is moveably attached to the first sidewall or the bar 2, the separator 60 becomes a block for preventing an unintended recipient who can access the first chamber 120 from reaching an article deposited in the second chamber 140. Moreover, the parcel box 100 allows the placements of parcels that exceed the dimensions of the starting first chamber 120 and the second chamber 140 by resizing the chambers using the separator 60.

In some embodiments, the parcel box 100 further includes an anti-theft member (e.g., guard or other mechanism) for covering the gap between the separator 60 and the second (or rear) sidewall 4 so as to prohibit access to the already delivered article in the second chamber 140 while at the same time allowing the first door 40 and the first chamber 120 to remain open until another delivery occurs before the first door 40 is locked. As shown in FIG. 5, the anti-theft member is a net 69. One end of the net 69 is connected to the rear end of the second plate 68a, and the other end of the net 69 is connected to the top of the second sidewall 4 such that the net 69 prevents an unintended recipient from reaching the fourth article 240 through the first chamber 120.

Figure 6:
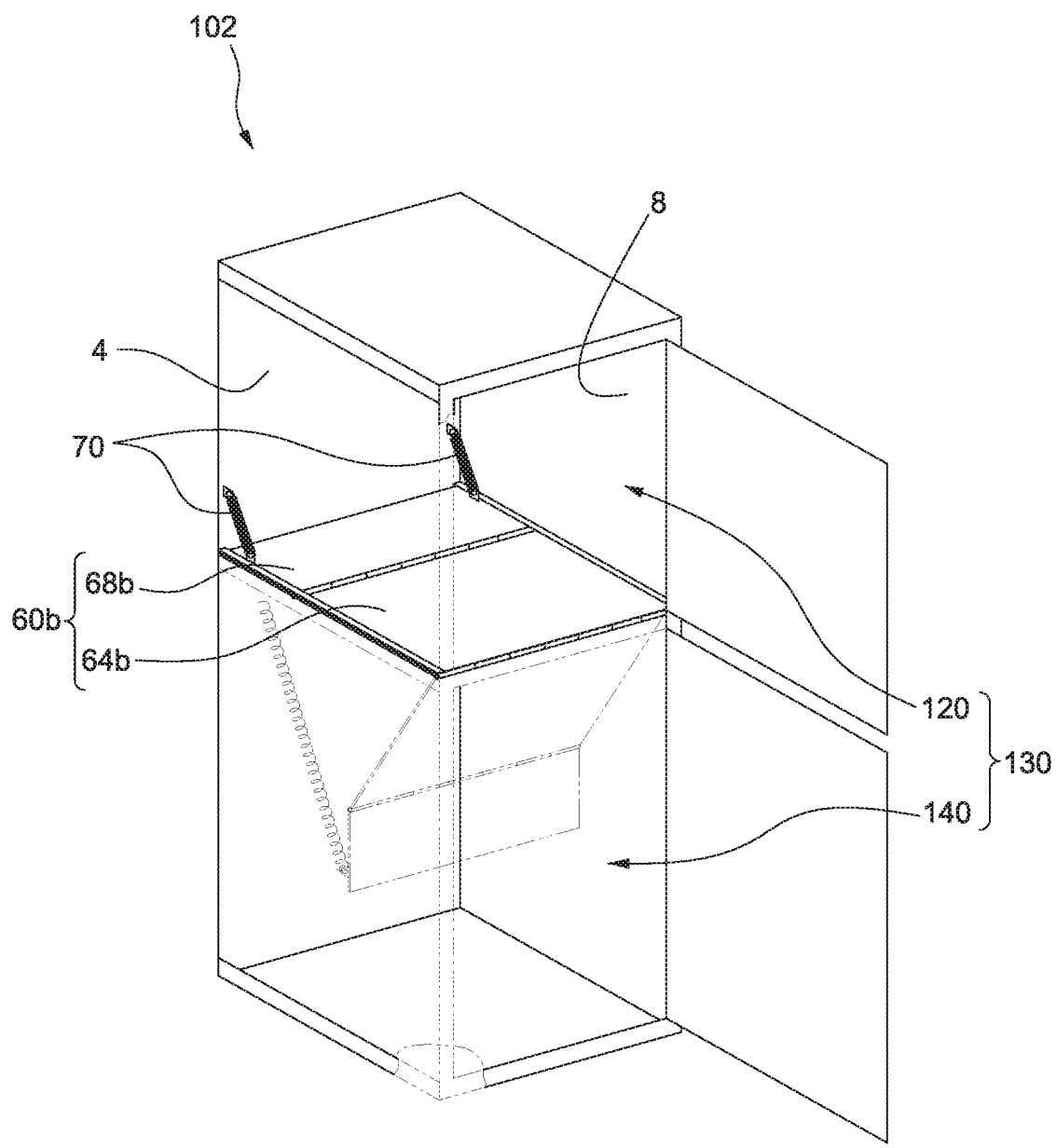
FIG. 6 is a perspective view of a parcel box in accordance with a second embodiment of the disclosure, where two doors are open, a sidewall is omitted, and the inside of the box is shown.

Referring to FIG. 6, which is a perspective view of a parcel box 102 in accordance with a second embodiment of the disclosure, the parcel box 102 does not have bracket(s) 16 but instead includes at least one resilient member 70. One end of the resilient member 70 is affixed to the second sidewall 4, and the other end of the resilient member 70 is affixed to the second plate 68b of the separator 60b. Two opposite edges of the second separator 68b are attached to the first plate 64b and the resilient member 70, respectively. The separator 60b is configured to be biased by the at least one resilient member 70 to a neutral position (i.e., the solid lines of the separator 60b), but then is moveable to allow a change to maximize the useful storage volume of the first chamber 120 and the second chamber 140. The resilient member 70 may be an extension spring. In this embodiment, the separator 60b may initially be horizontal (at the neutral position; indicated by the solid lines of the separator 60b), and may be moved or tilted downwardly (indicated by the dotted-dashed lines of the separator 60b) by a pushing of an article disposed in the first chamber 120, to change the initial size of the individual first chamber 120 and the second chamber 140. Specifically, by doing so, the volume of the first chamber 120 is increased for storing a larger article, and the volume of the second chamber 140 is reduced accordingly for storing a smaller article. Hence, the separator 60b is tensioned for self-closing, to permit itself to rotate so that a larger or different shaped article can be introduced into the first chamber 120, while the second chamber 140 remains secure. Some mechanisms or similar structures, such as additional springs, may also be attached to any portion of the separator 60b to help prevent access from the second chamber 140 to the first chamber 120, and vice versa. Additionally, the property of the at least one resilient member 70 is designed to control the amount of desired rotation of the separator 60b to prevent access from one chamber to another.

Figure 7:
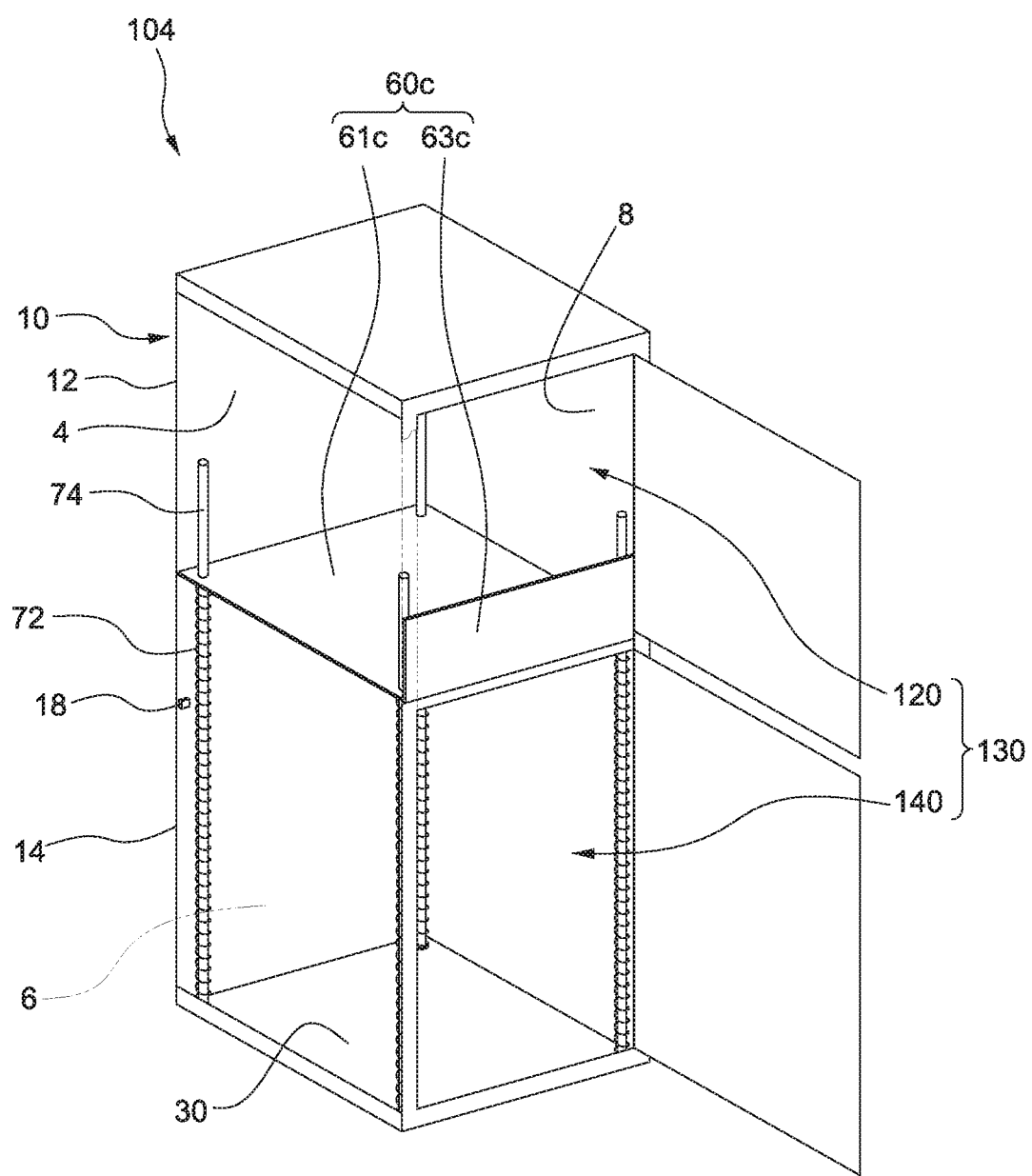
FIG. 7 is a perspective view of a parcel box in accordance with a third embodiment of the disclosure, where two doors are open, a sidewall is omitted, and the inside of the box is shown.
Figure 8:
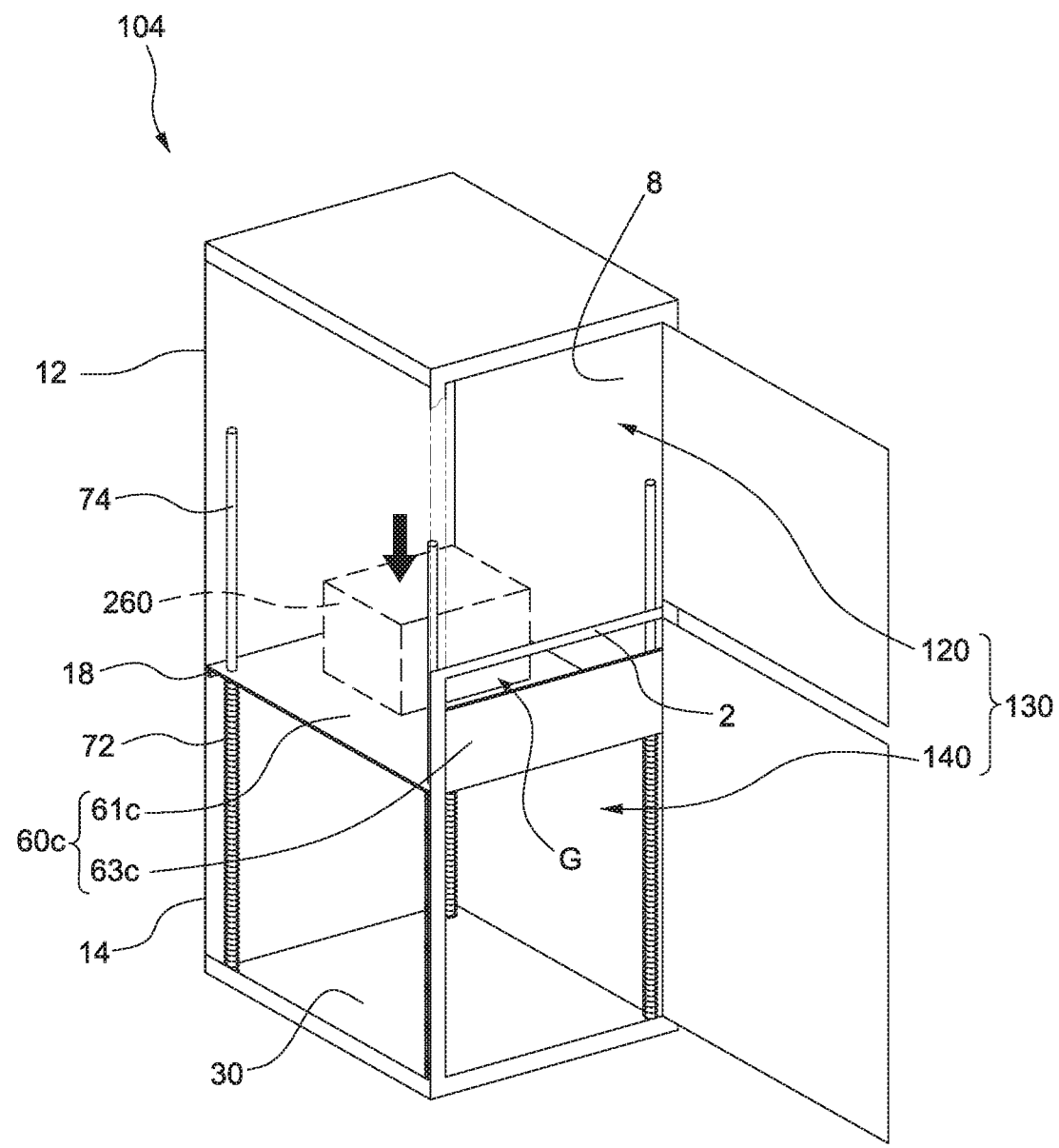
FIG. 8 is a perspective view of the parcel box in FIG. 7, where a separator is moved downwardly.

As shown in FIGS. 7-8, wherein FIG. 7 is a perspective view of a parcel box 104 in accordance with a third embodiment of the disclosure and FIG. 8 is a perspective view of the parcel box 104 in FIG. 7 where a separator 60c is moved downwardly, the parcel box 104 includes four resilient components 72 and four guiding members 74. The resilient components 72 may be compression springs and are disposed under four corners of the separator 60c for supporting the separator 60c. The guiding members 74 extend through the separator 60c and their respective resilient components 72. In this embodiment, the separator 60c further includes a base plate 61c and a front plate 63c vertically disposed on an edge (i.e., a front edge) of the base plate 61c. The base plate 61c defines the first chamber 120 and the second chamber 140. The resilient components 72 are configured to be compressed between the base plate 61c and the bottom plate 30. The guiding members 74 are rod-shaped, disposed on the bottom plate 30, and extend through the base plate 61c of the separator 60c for the base plate 61c to be moveable along the guiding members 74.

In operation, at a neutral position, as shown in FIG. 7, the base plate 61c of the separator 60c is located between the first compartment 12 and the second compartment 14. As shown in FIG. 8, when a sixth article 260 with its weight greater than a predetermined value is delivered to be disposed on the base plate 61c in the first chamber 120, the base plate 61c is moved downwardly towards the second chamber 140 due to the weight of the sixth article 260. In this embodiment, the parcel box 104 further includes multiple stoppers 18 disposed at the predetermined positions on the sidewalls 4, 6, 8 in the second compartment 14 for stopping the downward movement of the separator 60c, such that when the base plate 61c is in contact with the stoppers 18, the separator 60c is at the lowest position. In addition, when the separator 60c is at the lowest position, as shown in FIG. 8, the front plate 63c may be exposed to the second compartment 14. Even though a gap G is formed between the front plate 63c and the bar 2, the gap G is designed to be so small that an unintended recipient is unable to take the sixth article 260 out through the gap. Once the sixth article 260 is retrieved by a recipient, the separator 60c returns to its original position by the force exerted by the resilient components 72. Accordingly, since the separator 60c is moveable along the resilient components 72, the above mechanism may control the amount of desired movement of the separator 60c.

In other embodiments, the parcel box 104 may further include a height adjustment mechanism attached to the separator 60c for adjusting and fixing the height of the separator 60 according to actual needs.

Figure 9:
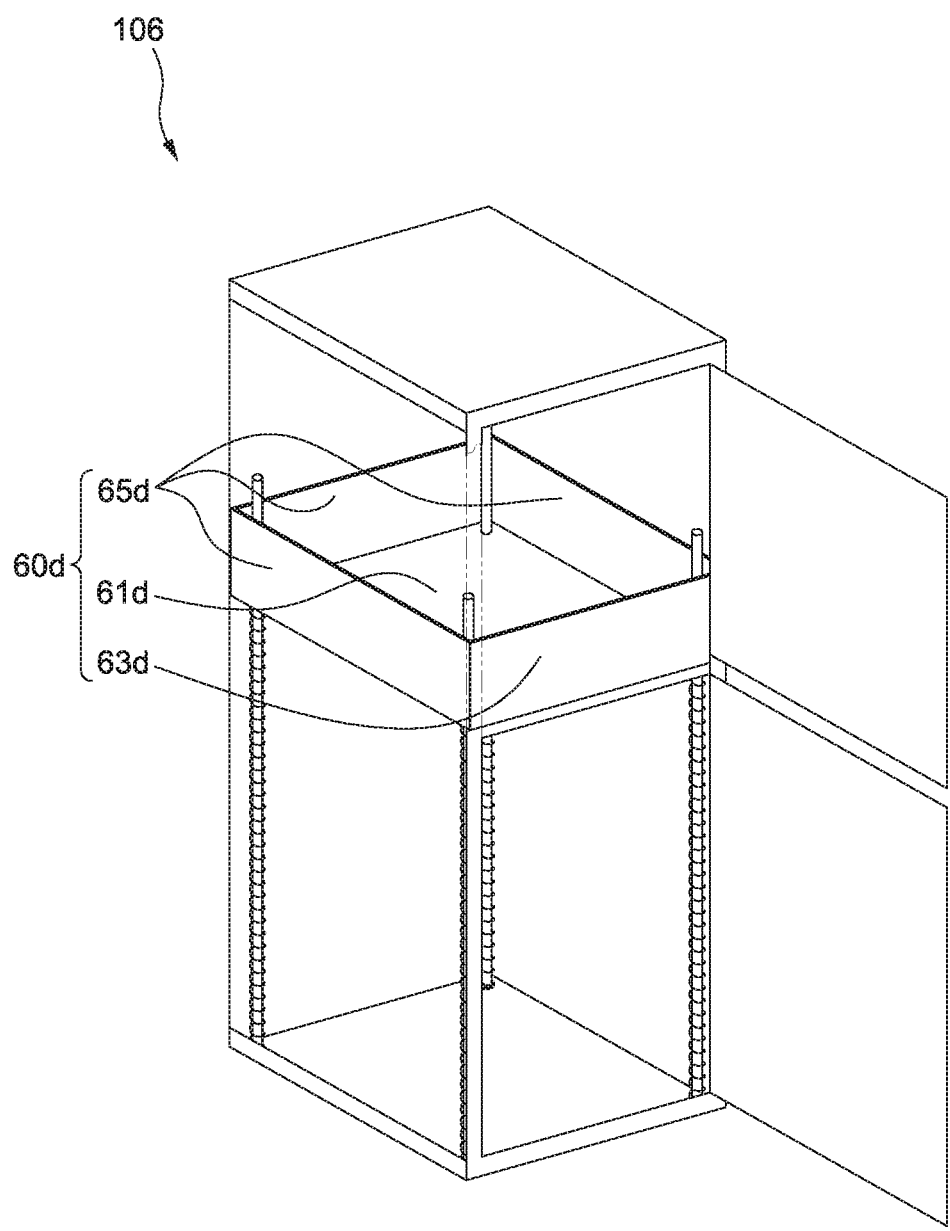
FIG. 9 is a perspective view of a parcel box in accordance with a fourth embodiment of the disclosure, where two doors are open, a sidewall is omitted, and the inside of the box is shown.

Referring to FIG. 9, which is a perspective view of a parcel box 106 in accordance with a fourth embodiment of the disclosure, the parcel box 106 further includes three side plates 65d vertically disposed on other edges (other than the front edge) of the base plate 61d, respectively. The front plate 63d and the three side plates 65d encompass the lower portion of the second chamber 140 such that the weight of the separator 60d is evenly distributed.

Figure 10:
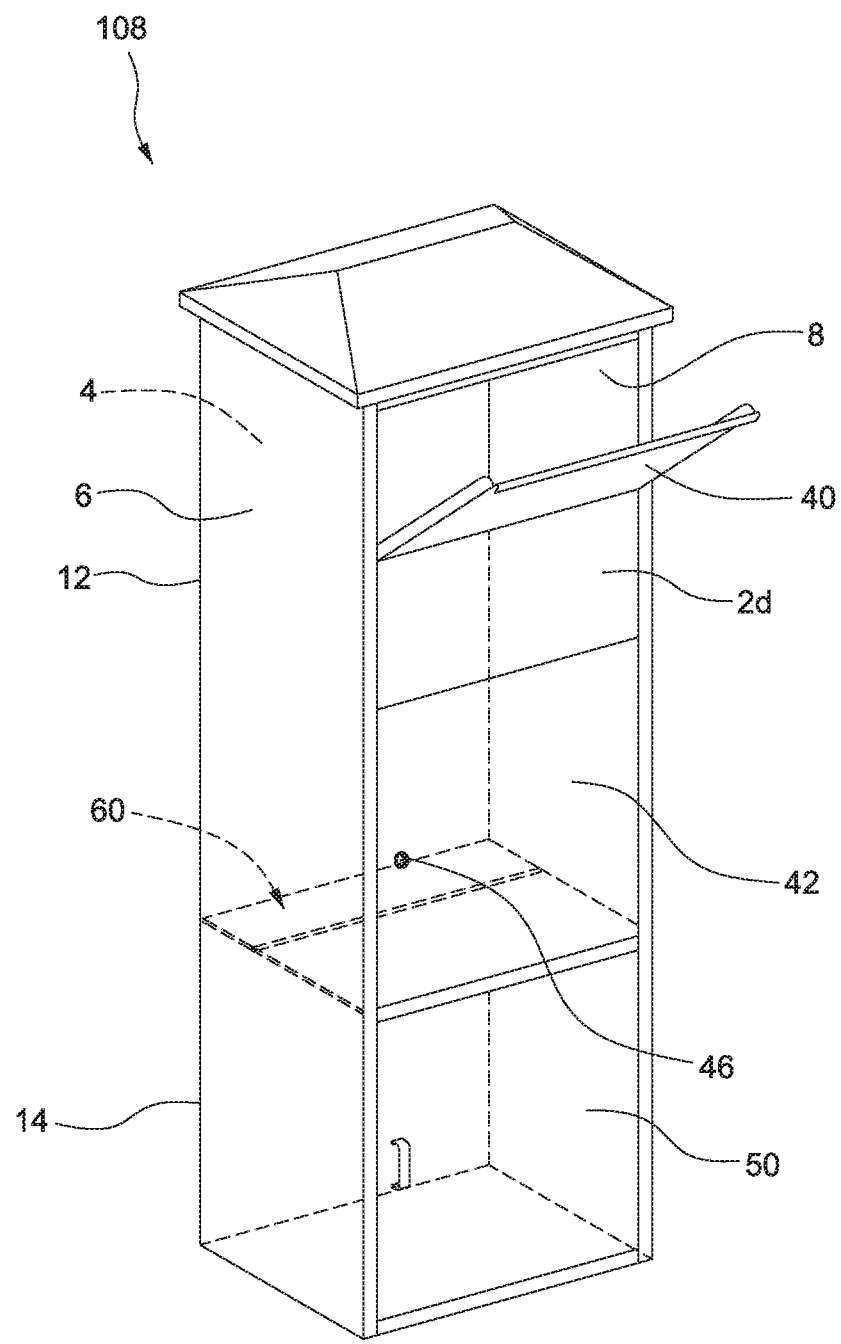
FIG. 10 is a perspective view of a parcel box in accordance with a fifth embodiment of the disclosure.

Referring to FIG. 10, which is a perspective view of a parcel box 108 in accordance with a fifth embodiment of the disclosure, the first compartment 12 is longer than the second compartment 14, and the parcel box 108 further includes a third door 42 open to the first compartment 12 and located between the first door 40 and the second door 50. The first door 40 is hinged on the first sidewall 2d and pivotally rotated about a horizontal axis. A delivery person may open the first door 40 and drop an article into the first chamber 120 through the first door 40. The parcel box 108 includes a third lock 46 for locking up the third door 42. A recipient may open the third lock 46 with a key to retrieve the article. The separator 60 is moveably located between the second door 50 and the third door 42 for adjusting the volume of the first chamber 120 and the volume of the second chamber 140.

Moreover, the parcel box 108 further includes a roof 22 with its length and width greater than those of the sidewalls 2', 4, 6, 8. The roof 22 is disposed on the top plate 20 by screws and is sloped with respect to the top plate (not shown) such that rain or snow may slide downwardly along the roof 22.

In other embodiments of the disclosure, the parcel box may include at least three chambers and at least two separators located between any two of the chambers adjacent to each other such that the separators allow the creation of variable volumes between individual chambers within the parcel box to facilitate the securing of parcels that may be delivered at different times. In other embodiments, the parcel box may include four or more chambers and three or more separators.

In sum, according to the present disclosure, each of the first chamber and the second chamber of the parcel box are configured to receive one or more articles through the first door and the second door, respectively, and the separator is configured to be moveable to adjust the volume of the first chamber and the volume of the second chamber based on the weights and/or the sizes of the articles, so that the interior room of the parcel box can be flexibly arranged. Furthermore, because the separator may block the path between the article and another chamber, it can prevent an unintended recipient from getting access to the article.

Moreover, the parcel box is not limited to a parallelepiped shape but could also have other shapes, such as a cylindrical body or a polygonal body to attract different customers.

Obviously, numerous modifications and variations of the present invention are possible in light of the above teachings. It is therefore to be understood that within the scope of the appended claims, the present invention may be practiced otherwise than as specifically described herein.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the broad scope of the following claims.

What is claimed is:

1. A parcel box, comprising:
   at least one sidewall having a first compartment and a second compartment that together form a room;
   a separator moveably attached to the at least one sidewall between the first compartment and the second compartment for separating the room into a first chamber and a second chamber, wherein the separator comprises:
   a first hinge attached to the at least one sidewall; and
   a first plate hinged on the at least one sidewall via the first hinge; and
   a first door and a second door pivotally attached to the at least one sidewall and corresponding to the first chamber and the second chamber, respectively,
   wherein the first chamber and the second chamber are configured to receive two articles through the first door and the second door, respectively, and the separator is configured to moveably adjust the volume of the first chamber and the volume of the second chamber based on the weights and/or the sizes of the two articles by a movement of the first plate between the first chamber and the second chamber.

2. The parcel box of claim 1, wherein the separator further comprises:
   a second hinge attached to an edge of the first plate; and
   a second plate hinged on the first plate via the second hinge.

3. The parcel box of claim 1, further comprising:
   at least one bracket positioned on the at least one sidewall for supporting an edge of the separator.

4. The parcel box of claim 1, wherein the first compartment is above the second compartment, and when one of the articles is disposed in the second chamber and the length of the one of the articles is greater than the length of the second chamber, the separator is moved towards the first chamber.

5. The parcel box of claim 1, further comprising:
   two locks disposed on the first door and the second door, respectively.

6. The parcel box of claim 1, further comprising:
   a bottom plate on which the at least one sidewall is disposed; and
   a top plate disposed on the at least one sidewall.

7. The parcel box of claim 6, wherein the at least one sidewall includes four sidewalls standing on the bottom plate to form a parallelepiped shape with the top plate.

8. The parcel box of claim 1, further comprising:
   a guard mechanism attached to the separator for separating the first chamber from the second chamber.

9. The parcel box of claim 1, further comprising:
   a third door located between the first door and the second door, and the first chamber being accessible through the third door.

10. A parcel box, comprising:
    at least one sidewall having a first compartment and a second compartment that together form a room;
    a separator moveably attached to the at least one sidewall between the first compartment and the second compartment for separating the room into a first chamber and a second chamber;
    a first door and a second door pivotally attached to the at least one sidewall and corresponding to the first chamber and the second chamber, respectively; and
    at least one resilient member, one end of which is affixed to the at least one sidewall, and the other end of which is affixed to the separator,
    wherein the first chamber and the second chamber are configured to receive two articles through the first door and the second door, respectively, and the separator is configured to moveably adjust the volume of the first chamber and the volume of the second chamber based on the weights and/or the sizes of the two articles by a movement of the first plate between the first chamber and the second chamber.

11. The parcel box of claim 10, wherein the first chamber is above the second chamber, and when one of the articles is positioned on the separator, the separator is moved towards the second chamber.

12. A parcel box, comprising:
   at least one sidewall having a first compartment and a second compartment that together form a room;
   a separator moveably attached to the at least one sidewall between the first compartment and the second compartment for separating the room into a first chamber and a second chamber;
   a first door and a second door pivotally attached to the at least one sidewall and corresponding to the first chamber and the second chamber, respectively;
   a plurality of resilient members disposed under the separator for supporting the separator; and
   a plurality of guiding members penetrating through the separator and the plurality of resilient members, respectively,
   wherein the first chamber and the second chamber are configured to
   receive two articles through the first door and the second door, respectively, and the separator is configured to moveably adjust the volume of the first chamber and the volume of the second chamber based on the weights and/or the sizes of the two articles with supports of the plurality of resilient members by a movement of the first plate between the first chamber and the second chamber.

13. The parcel box of claim 12, wherein the separator further comprises:
   a base plate; and
   a front plate disposed on an edge of the base plate.

14. The parcel box of claim 13, wherein the separator further comprises:
   a plurality of side plates disposed on other edges of the base plate, respectively.

* * * * *